(12) United States Patent
Asahara

(10) Patent No.: US 7,302,418 B2
(45) Date of Patent: Nov. 27, 2007

(54) TRADE-OFF/SEMANTIC NETWORKS

(75) Inventor: Eugene A. Asahara, Redwood City, CA (US)

(73) Assignee: Microsoft Corporation, Redmond, WA (US)

(*) Notice: Subject to any disclaimer, the term of this patent is extended or adjusted under 35 U.S.C. 154(b) by 234 days.

(21) Appl. No.: 10/966,302

(22) Filed: Oct. 15, 2004

(65) Prior Publication Data
US 2006/0167827 A1    Jul. 27, 2006

(51) Int. Cl.
*G06N 5/00* (2006.01)

(52) U.S. Cl. .................. 706/55; 706/15; 706/19; 706/45; 706/47; 706/60; 714/100; 714/2; 714/25; 714/26; 714/46; 714/47; 714/48

(58) Field of Classification Search .......... 706/10, 706/14–21, 45–47, 55, 59; 707/9, 10, 102
See application file for complete search history.

(56) References Cited

U.S. PATENT DOCUMENTS

| | | | | |
|---|---|---|---|---|
| 4,815,005 A | * | 3/1989 | Oyanagi et al. | 706/55 |
| 4,866,635 A | * | 9/1989 | Kahn et al. | 706/46 |
| 5,157,668 A | * | 10/1992 | Buenzli et al. | 714/26 |
| 5,937,400 A | * | 8/1999 | Au | 706/55 |
| 6,535,865 B1 | * | 3/2003 | Skaaning et al. | 706/52 |

* cited by examiner

Primary Examiner—David Vincent
Assistant Examiner—Omar F Fernández Rivas
(74) Attorney, Agent, or Firm—Vierra Magen Marcus & DeNiro LLP (57) ABSTRACT

Trade-off/semantic networks are described, including identifying a plurality of elemental attributes, relating each of the plurality of elemental attributes to each other to configure a trade-off relationship between each of the plurality of elemental attributes, and defining an agility extension configured to modify a value for each of the plurality of elemental attributes, where the value affects the trade-off relationship between each of the plurality of elemental attributes. A system is also described, including a user interface configured to provide user input to and data output from a trade-off semantic network, a plurality of elemental attributes arranged within the trade-off semantic network, a configuration module for relating each of the plurality of elemental attributes to each other to configure a trade-off relationship between each of the plurality of elemental attributes, and a logic module configured to define an agility extension configured to modify a value for each of the plurality of elemental attributes, where the value affects the trade-off relationship between each of the plurality of elemental attributes.

26 Claims, 7 Drawing Sheets

TRADE-OFF/SEMANTIC NETWORKS

FIELD OF THE INVENTION

The present invention relates generally to software, and more specifically, trade-off/semantic networks.

BACKGROUND OF THE INVENTION

In system administration, configuration, troubleshooting, and other similar tasks, various resources, components, and other environmental factors are evaluated. However, administration may be difficult and complex, particularly with configurable systems. Installation and administration of configurable systems are problematic because various features, if altered, may result in cascading effects that can negatively affect overall system performance. Given the complexity involved with large-scale systems, such as distributed or enterprise software systems, modification of a single resource or component may lead to unpredictable or unforeseen effects.

There are several challenges associated with resource and system configuration of complex systems. Numerous resources such as individual servers, clients, databases, and other components may be placed into a particular system configuration. Troubleshooting a performance problem may be difficult because each performance problem in a configuration may require the manipulation of multiple resources. Determining which resources to manipulate can involve significant time, skill, and labor. Another challenge occurs when a resource is manipulated to alleviate a problem, but creates or causes an unforeseen effect in other resources. Configurable systems are difficult to troubleshoot given relationships between system components. For example, a server-based system (e.g., SQL server) may be affected by one or more resources or attributes including CPU speed, CPU stress, hardware costs, available memory, and communication bus speed. However, when one of these attributes is modified, an unforeseen, detrimental effect may be caused, resulting in poor system performance.

Thus, what is needed is a solution for managing configurable systems while avoiding the limitations of conventional techniques.

SUMMARY OF THE INVENTION

In system configuration, there is a need for proactively and reactively managing changes, attributes, and other elemental attributes for troubleshooting, administration, and maintenance purposes. The use of a trade-off/semantic network enables configurable systems to be managed using a graph or map of trade-off relationships between elemental attributes.

In one example, a method for authoring a trade-off semantic network is described, including identifying a plurality of elemental attributes, relating each of the plurality of elemental attributes to the others to configure a trade-off relationship between each of the plurality of elemental attributes, and defining an agility extension configured to modify a value for each of the plurality of elemental attributes, wherein the value affects the trade-off relationship between each of the plurality of elemental attributes and the trade-off semantic network.

In another example, a method for using a trade-off semantic network is described, including providing a map of the trade-off semantic network, including a plurality of nodes and a relationship between each of the plurality of nodes, the relationship and the plurality of nodes having a cause and an effect on a current configuration, determining if pain exists in the current configuration, and enabling manipulation of a value of each of the plurality of nodes to alleviate the pain.

As another example, a method for using a trade-off semantic network is described, including identifying a pain point, determining a path associated with the pain point, returning a plurality of nodes associated with the pain point, determining whether any of the plurality of nodes has changed, returning a new plurality of nodes associated with the pain point, and enabling the manipulation of a value associated with each node of the new plurality of nodes to correct the pain point.

Yet another example describes a trade-off semantic network including an authoring tool configured to map the trade-off semantic network including one or more elemental attributes, a logic module configured to evaluate information from the trade-off semantic network, and a configuration module configured to determine a value for the one or more elemental attributes.

Another example describes a system for modeling trade-offs including a user interface configured to provide user input to and data output from a trade-off semantic network, a plurality of elemental attributes arranged within the trade-off semantic network, a configuration module for relating each of the plurality of elemental attributes to each other to configure a trade-off relationship between each of the plurality of elemental attributes, and a logic module configured to define an agility extension for modifying a value for each of the plurality of elemental attributes, wherein the value affects the trade-off relationship between each of the plurality of elemental attributes.

Still another example includes a computer program product for configuring a trade-off semantic network. The computer program product is embodied in a computer readable medium and comprises computer instructions for: identifying a plurality of elemental attributes; relating each of the plurality of elemental attributes to each other to configure a trade-off relationship between each of the plurality of elemental attributes; and defining an agility extension configured to modify a value for each of the plurality of elemental attributes, the value affects the trade-off relationship between each of the plurality of elemental attributes.

Additional features and advantages of the invention are set forth in the following description, are obvious from the description, or may be learned by the practicing the described techniques. The features and advantages may be realized and obtained by means of the implementations and combinations particularly pointed out in the appended claims.

BRIEF DESCRIPTION OF THE DRAWINGS

Various embodiments of the invention are disclosed in the following detailed description and the accompanying drawings.

DETAILED DESCRIPTION OF THE PREFERRED EMBODIMENTS

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of the disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configurable systems may be diagnosed and managed using a trade-off/semantic network (hereinafter "trade-off semantic network," "trade-off/semantic network" or "TOSN"). As a tool, a TOSN may be used to graph or map trade-off relationships between elemental attributes in a system (e.g., SQL server). Elemental attributes ("attributes") describe each facet of a system's resources, components, devices, or a system's basic characteristics. Incremental changes to attributes may cause an overall effect because of the existence of trade-off relationships. Trade-off relationships or "trade-offs" are based on the interaction between elemental attributes. By manipulating values of elemental attributes (i.e., basic aspects of a system, such as but not limited to memory, CPU clock speed, RAM, and the like) and trade-off relationships, administrators may perform proactive and reactive system configuration, enabling efficient system administration. Various classes of paths in a TOSN may also be used to manage elemental attributes, trade-off relationships, and other aspects of configurable systems.

Figure 1:
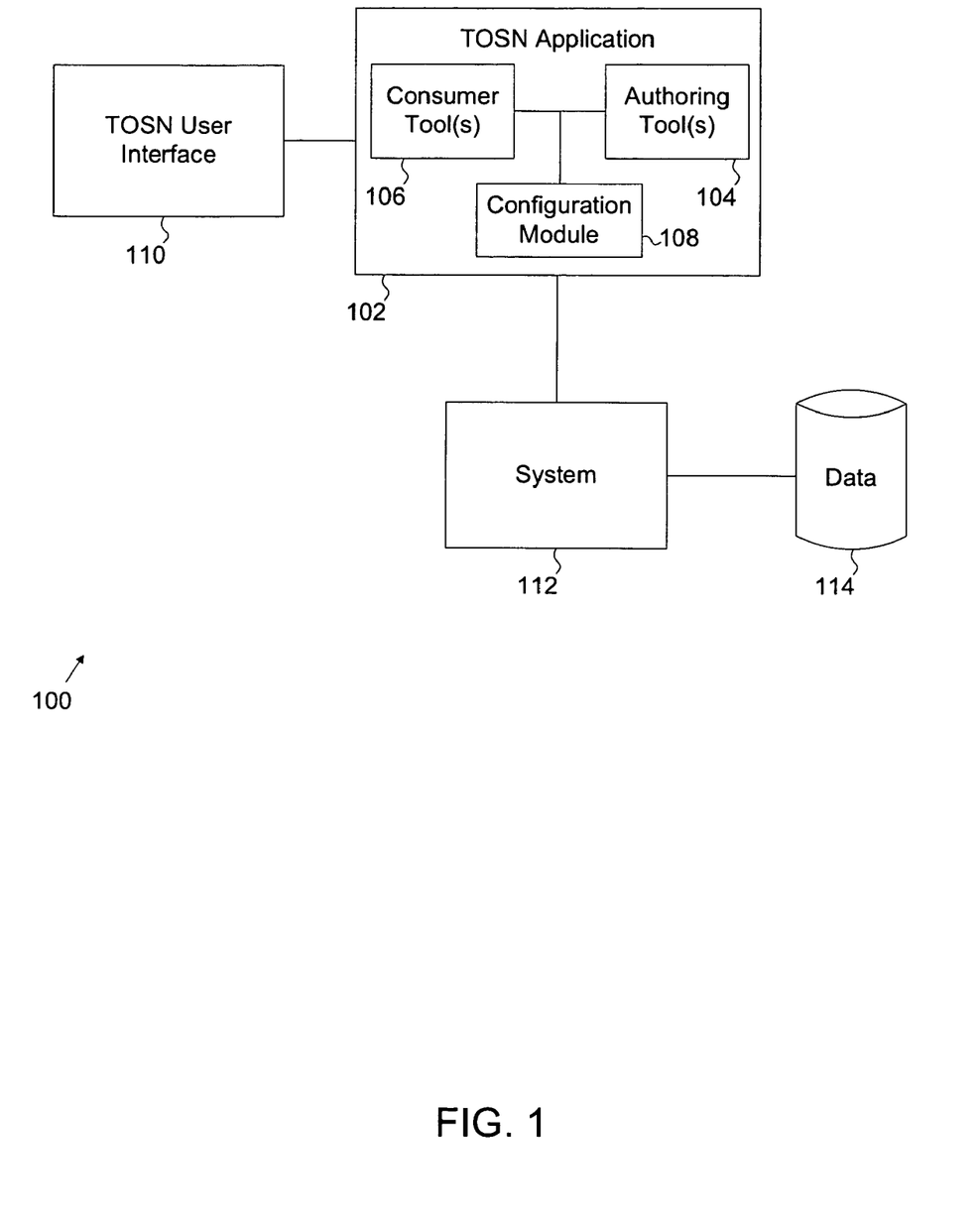
FIG. 1 illustrates an exemplary trade-off/semantic network implementation.

FIG. 1 illustrates an exemplary trade-off/semantic network implementation 100. In this example, TOSN 100 includes a trade-off/semantic network (TOSN) application 102, which also includes authoring tool 104, consumer tool 106, configuration module 108. Configuration module 108 may also be described as a logic module, in some examples. As an example, authoring tool 104 may be implemented as a user interface providing the ability for a system administrator or developer to implement a TOSN for a given system. Authoring tool 104 may be implemented using programming and formatting languages such as C++, C#, HTML, XML, and others. As another example, consumer tool 106 may be used as a visualization tool such as Visio® developed by Microsoft Corporation of Redmond, Wash. Using logic in configuration module 108, authoring tool 104 and consumer tool 106 provide, for example, a comprehensive system, computer program, or application that may be used to implement, author, and manipulate a TOSN, as described in greater detail below in connection with FIG. 3.

In some examples, authoring tool 104 and consumer tool 106 may include more than one tool, module, or system. TOSN user interface 110 provides a communication interface between TOSN application 102 and a user (not shown). TOSN application 102 may be used to map trade-offs associated with system 112, using data from database 114. In some cases, data base 114 may be implemented using various techniques including a storage system, network (e.g., SAN), facility, repository, or other storage resource. In some examples, TOSN application 102 may also be installed on a client with a system that is being managed. In other examples, TOSN application 102 may be remotely installed at one location while managing disparate resources at other locations. TOSN application 102 may be used to manage relationships such as those shown in FIG. 2.

Figure 2:
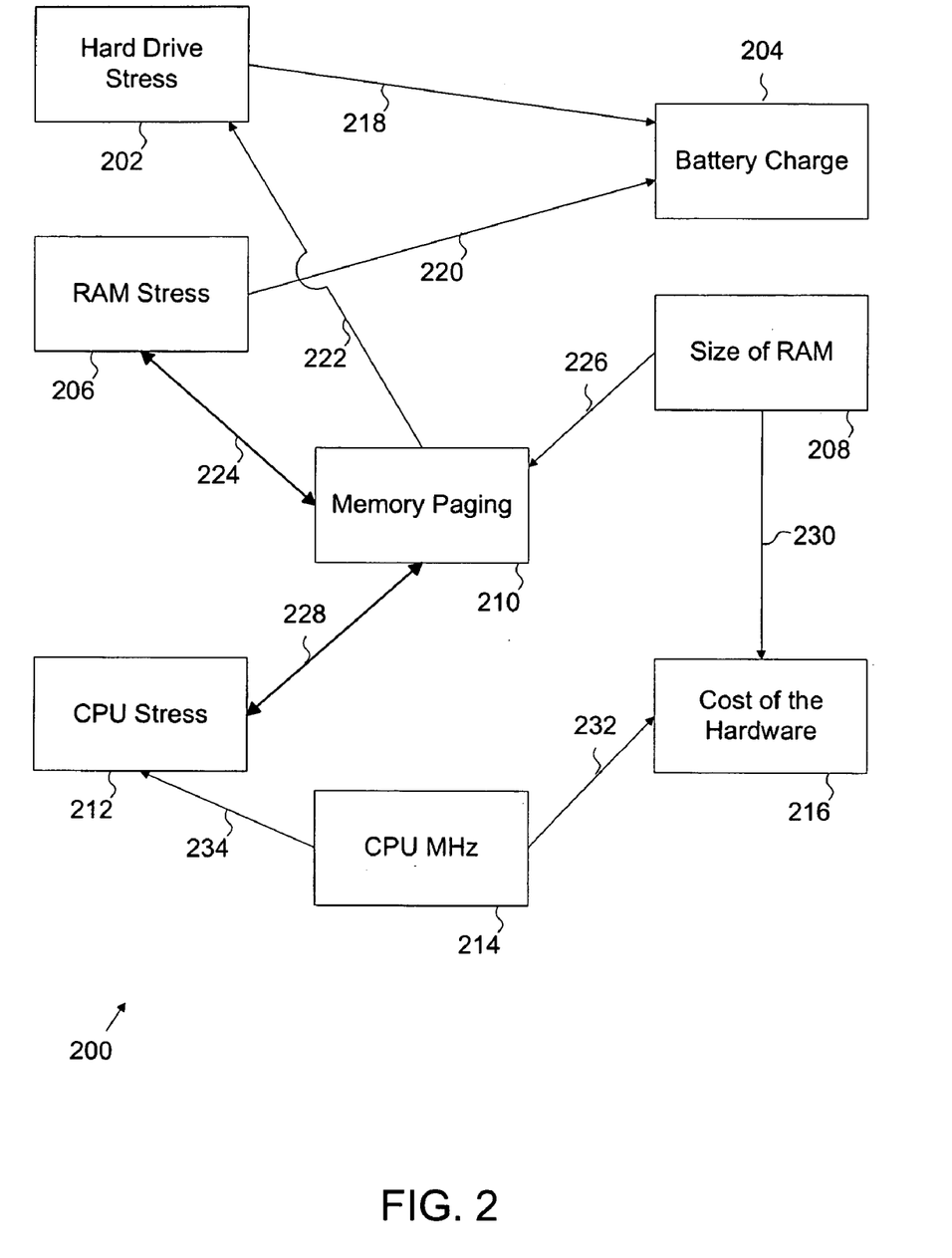
FIG. 2 illustrates an exemplary trade-off network.

FIG. 2 illustrates an exemplary trade-off network. The trade-off network or "TO" is part of a TOSN. TOSN 200 includes several components including nodes that represent elemental attributes. Elemental attributes include abstract representations of real-world system attributes such as performance characteristics, system or component parameters, environmental conditions, or the like. In general, TOSN 200 is a mapping of trade-offs in a system between various resources expressed as a collection of elemental attributes. As an example, "elemental" may refer to basic aspects of a system such that between any two elemental attributes, a single trade-off relationship exists. In other examples, elemental attributes may also be described as having a single value dimension. TOSN 200 is a fragment of an overall larger TOSN. In this example, a web-like or trade-off graph is shown, illustrating various elemental attributes associated with a computer system. Elemental attributes 202-216 represent basic aspects of a computer system such as hard drive stress, battery charge, random access memory (RAM) stress, size of RAM, memory paging, central processing unit (CPU) stress, CPU speed (expressed in megahertz, MHz), and cost of hardware. In other examples, TOSN 200 may be used to map other types of systems other than a computer system. Systems, devices, apparatus, logical structures, and other complex decision-making environments may be mapped, managed, and manipulated using TOSN 200. In other examples, abstract decision-making logic may be implemented using TOSN 200 to map the effects of decisions upon one or more variables. Several aspects of TOSN 200 are discussed in greater detail below.

Trade-off relationships 218-234 are shown between each of elemental attributes 202-216. These relationships illustrate basic characteristics of trade-offs between system resources or components when values for elemental attributes are adjusted. In some cases, modifying the value of a single elemental attribute may cause the value of an elemental attribute associated with a trade-off relationship to be affected in a directly proportional or inversely proportional manner. In the case of directly proportional relationships, the relationship between two elemental attributes is such that as the value of the first elemental attribute increases, the value of the second elemental attribute also increases. In the case of indirectly proportional relationships, the relationship between the two elemental attributes is such that as the value of the first elemental attribute increases, the value of the second elemental attribute decreases. In either case, the reverse may be true. In either case, the impact of modifying the value of one elemental attribute on another node may be referred to as an "affect." Affects may also be described in terms of the direction or strength of a trade-off relationship. Trade-off relationships may also be described as unidirectional or bidirectional. In the case of unidirectional relationships, modifying the value of one elemental attribute has an affect on another elemental attribute, but not vice versa. For bidirectional relationships, two elemental attributes may affect each other across a trade-off relationship in either direction. In other words, a bidirectional relationship enables, for example, elemental attribute 306 to affect elemental attribute 310 and vice versa. By establishing a trade-off graph using elemental attributes connected through trade-off relationships, a system may be mapped to determine the particular effects changing one or more elemental attributes of a specific configuration, providing a valuable tool for system administrators, managers, and developers.

TOSN 200 may be used for various purposes by system administrator, managers, and developers. As an example, configurable systems may be mapped using TOSN 200 to identify lowest-level system components, resources, and attributes as elemental attributes. Upon determining elemental attributes, trade-off relationships may be established. Trade-off relationships may be used to determine the effect of one elemental attribute upon another, as well as indicate a direction (e.g., bidirectional, unidirectional) and a strength of the relationship. In some examples, trade-off relationships may be associated with paths, which may be used to determine a "treatment" for the alleviation of "pain" associated with a particular configuration. In some examples, "pain" may be described as a condition where system tolerances, limits, or parameters are exceeded. For example, a trade-off relationship may cause available memory (e.g., RAM) to be exceeded. For example, different classes of paths (e.g., first-class, second-class, third-class) may be used to aid administrators in diagnosing a problem in a system, where the paths may be used to narrow or identify the particular source of pain for an elemental attribute. Classes of paths will be described in greater detail below in connection with FIGS. 5A and 5B. Pain may be described as a system or configuration problem that may affect one or more elemental attributes, and which may be alleviated, transferred, or eliminated by modifying the value of one or more elemental attributes in TOSN 200. In some cases, elemental attribute values that do not share a direct trade-off relationship may be modified to indirectly alleviate system pain. Several elemental attributes may be affected by a single pain source. Likewise, several elemental attributes may be causing pain at, or to, a particular elemental attribute. For example, referring to FIG. 2, pain may be caused at battery charge elemental attribute 204 by hard drive stress elemental attribute 202 and RAM stress elemental attribute 206. In these cases, both elemental attributes 202 and 206 are depleting battery charge and causing a detrimental effect at and to elemental attribute 204. As another example, size of RAM elemental attribute 208 may create performance or configuration restrictions at memory paging elemental attribute 210 and cost of the hardware elemental attribute 216. TOSN 200 enables administrators to preview, diagnose, and manipulate system configurations in order to determine resultant effects of modifications to values of various elemental attributes.

Using a TOSN may be performed through a user interface such as TOSN user interface 110 (FIG. 1), providing data communication and display abilities with TOSN application 102. As an example, system 112 may be managed by evaluating and analyzing its attributes (including database 114) to identify issues involved with system performance, maintenance, and troubleshooting. In some examples, a user interface (not shown) may be used in which TOSN 200 is illustrated in one window, a taxonomy and/or trade-off data structure or categories may be illustrated in another window, with reports of system information generated in yet another window. In other examples, various user menus and actions may be performed to graphically manipulate elemental attribute values (e.g., sliding a bar and changing the value of an elemental attribute or trade-off relationship, double-clicking on an elemental attribute or trade-off relationship icon and entering a value for an elemental attribute, selecting an elemental attribute or trade-off relationship in a window and entering a value, or other similar user interface-oriented actions). Various techniques may be used to implement a user interface for TOSN application 102 and TOSN 200 other than those described above and are not limited to the examples provided. A taxonomy may be used with a trade-off graph such as that described in FIG. 2.

A taxonomy, which refers to the "SN" side of a TOSN, provides a separate framework for analyzing and performing other tasks in relation to TOSN 200. As an example, trade-off relationships may fall into various categories, including parent-child relationships or those that are specific to a given context (e.g., SQL server, system or network configurations, and others). Trade-off relationships may include trade-off relationships such as those illustrated in FIG. 2. In other examples, trade-off relationships may also include elemental attributes such as those shown in FIG. 2, and described above. Here, elemental attributes may be classified using a taxonomy including terms such as "part of a", "is a", or "a kind of". These relationships may also be considered as sub-categories. These are sub-categories for classifying trade-offs that aid in describing and analyzing a TOSN. In other examples, more, fewer, or different relationships may be used. Using a taxonomy, elemental attributes may be categorized and reconstituted into real-world objects, that enable inference of information that may be useful to a administrator, developer, or other TOSN user.

Each of the sub-categories provides a classification for the different types of elemental attributes that may be used in a TOSN. The "part of a" sub-category may be used to classify trade-off relationships as a collection of items in a process, procedure, object, or other abstract concept. The "a kind of" sub-category classifies elemental attributes that may be grouped as a set of choices. For example, the use of a table-join may involve three types: merge, hash, and nested. By selecting one of the types of table-joins, a trade-off relationship is "a kind of" type of join. Finally, the "is a" sub-category enables trade-off relationships that are similar to each other to be grouped together. However, trade-off relationships in this category are different than those in the "a kind of" category in that they are not interchangeable with other similar trade-off relationships. In other examples, different categories and sub-categories of trade-off relationships may be used as a taxonomy for classifying relationships between elemental attributes in a TOSN. In still other examples, more or fewer categories and sub-categories may be used to describe trade-off relationships. TOSN application 102 may be implemented using computer source code to perform functions such as those described below in connection with FIGS. 3-5.

Figure 3:
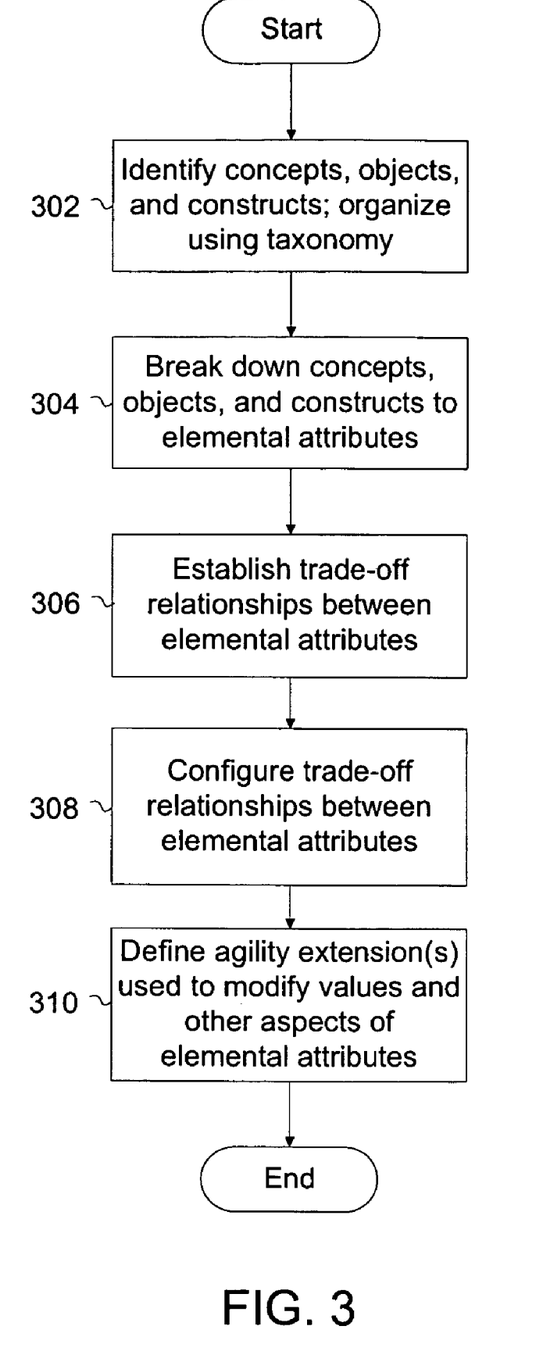
FIG. 3 illustrates an exemplary process for authoring a trade-off/semantic network.

FIG. 3 illustrates an exemplary process for authoring a trade-off/semantic network. In this example, the authoring of a TOSN begins by identifying the objects, concepts and constructs particular to the system (302). As part of the identification, the items may be categorized using a taxonomy, such as that described above, consisting of "is a," "part of a" and "a kind of" sub-categories of parent-child relationships, for example. Each item is broken down at individual layers until reduced into elemental attributes (304). As an example, the elemental attributes may comprise leaf members of the taxonomy. These leaf members act as gateways from the taxonomy to the trade-off map. Once identified and broken down to elemental attributes, trade-off relationships may be established between the elemental attributes (306). After establishing trade-off relationships between elemental attributes, configuration of the trade-off relationships may be performed as desired using TOSN application 102 (308). Some examples of configuration actions that may be performed include specifying a range of values for a particular elemental attribute (e.g., CPU MHz may not be increased more than 1.4 GHz, etc.) or indicating a direction of a relationship (e.g., RAM stress 206 may affect battery charge 204, but battery charge 204 may not affect RAM stress 206 because the relationship is unidirectional). Once trade-off relationships have been configured, then agility extensions may be defined, which enable an affect to have simultaneous and multiple effects on a TOSN 200 (310). Some examples of agility extensions include definitions for the value of an elemental attribute, the maximum value of an elemental attribute, the minimum value of an elemental attribute, the level of pain in a node (e.g., 0 indicates no pain, 5 may indicate moderate pain, 10 may indicate extreme pain, which could adversely affect or prevent system performance, or other values for indicating a range of affects of configurations upon a system), level of change experienced by a node, strength of a trade-off relationship, direction of a trade-off relationship, effect of a trade-off relationship, or others. Agility extensions may be defined for other values beyond those listed above. Agility extensions may also be defined as literal values, source code, a COM or CLR call, or a database stored procedure. In some cases, a TOSN may be implemented using an application programming interface (API) that facilitates the definition of agility extensions that may be pertinent to a particular system or program. A TOSN may be used after implementation, and usage cases are described in further detail below in connection with FIGS. 4, 5A, and 5B.

Figure 4:
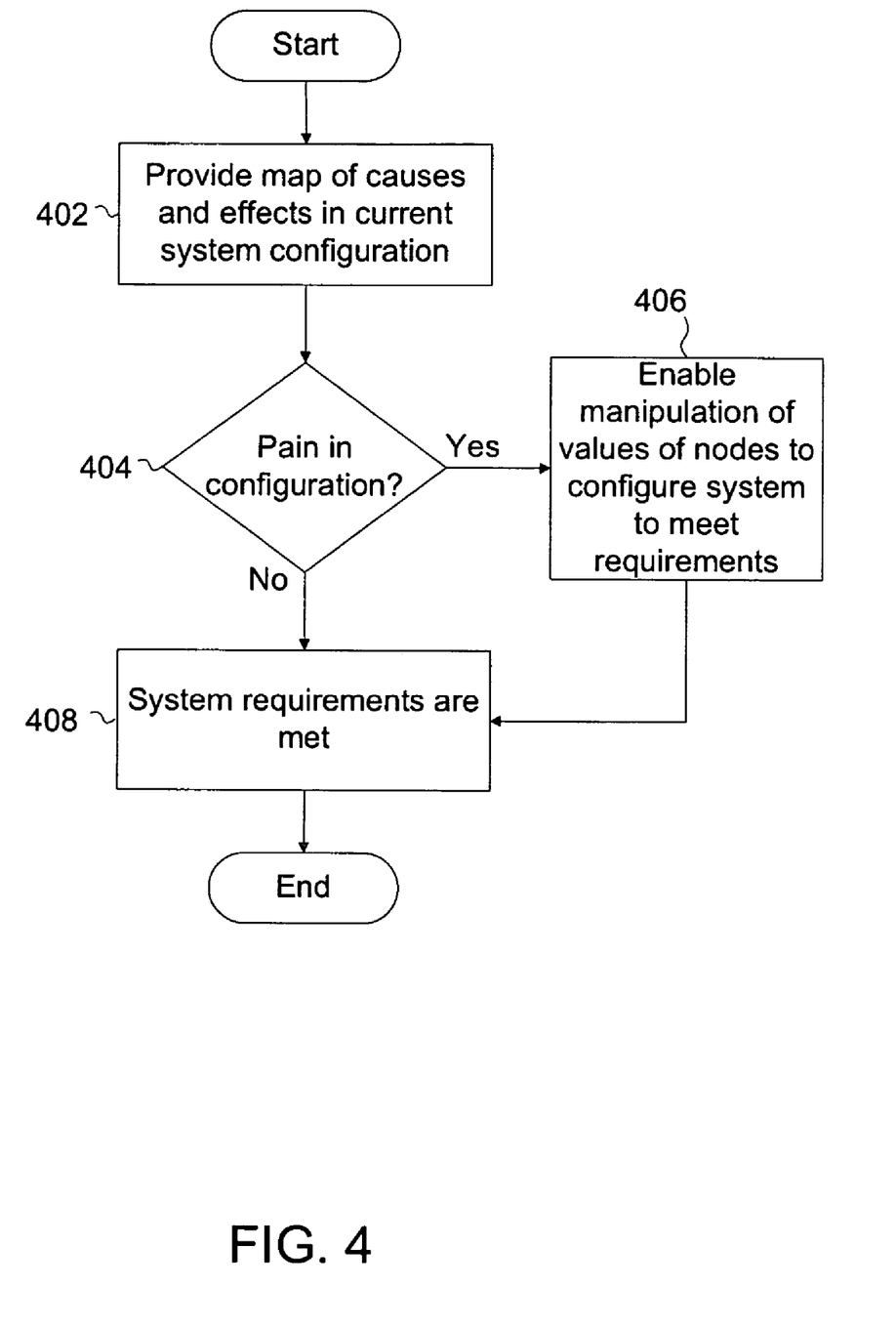
FIG. 4 illustrates an exemplary process for proactively using a trade-off/semantic network.

FIG. 4 illustrates an exemplary process for proactively using a trade-off/semantic network. TOSNs may be used to perform preventive or corrective system configuration and administration. Proactively, a TOSN may be used to determine whether system requirements are met by a particular configuration. For example, a map or graph may be provided, illustrating causes and effects resulting from a current system configuration (402). A determination may be made by, for example, TOSN application 102 (FIG. 1) as to whether any pain exists in the current configuration (404). Pain may refer to non-optimal system components or resource performance. If pain is present in the current system configuration, then TOSN 200 enables elemental attributes to be manipulated in order to modify values in an alternative system configuration that alleviates or reduces pain (406). System pain may include component or resource demands exceeding normal performance limits (e.g., hard drive stress) or actual device or component limits (e.g., size of RAM) specified either automatically or by a user (e.g., user-specified access to particular resources). If intolerable pain is not present, then the current system performance requirements are met (408). As an example, "intolerable" may occur where actual conditions experienced by an elemental attribute (i.e., a node in TOSN 200) exceed limits or tolerances by such an amount that an emergent condition may exist, resulting in an alarm, immediate response, de-activation, or another corrective action. By proactively managing or manipulating elemental attribute values, TOSN 200 may be used as a tool to achieve an optimum system configuration for performance.

As a planning tool, TOSNs enable system administrators to preview the effect of modifying or adjusting the value of an elemental attribute. As an example, if a system administrator reduces the amount of available memory storage for a system, trade-off relationships may convey various effects to a system. In the example shown in FIG. 2, if "size of RAM" elemental attribute 208 is reduced, affects may occur in "memory paging" elemental attribute 210 and "cost of the hardware" elemental attribute 216 because of unidirectional trade-off relationships. In other examples, indirect effects may cascade to other elemental attributes in TOSN 200. Different configurations or processes for using TOSN 200 may be implemented and the above example is a single illustration of how TOSNs may be used to diagnose system performance in a proactive manner. TOSN 200 may also be used in a reactive manner, as a tool for alleviating or reducing pain in a current system configuration.

Figure 5A:
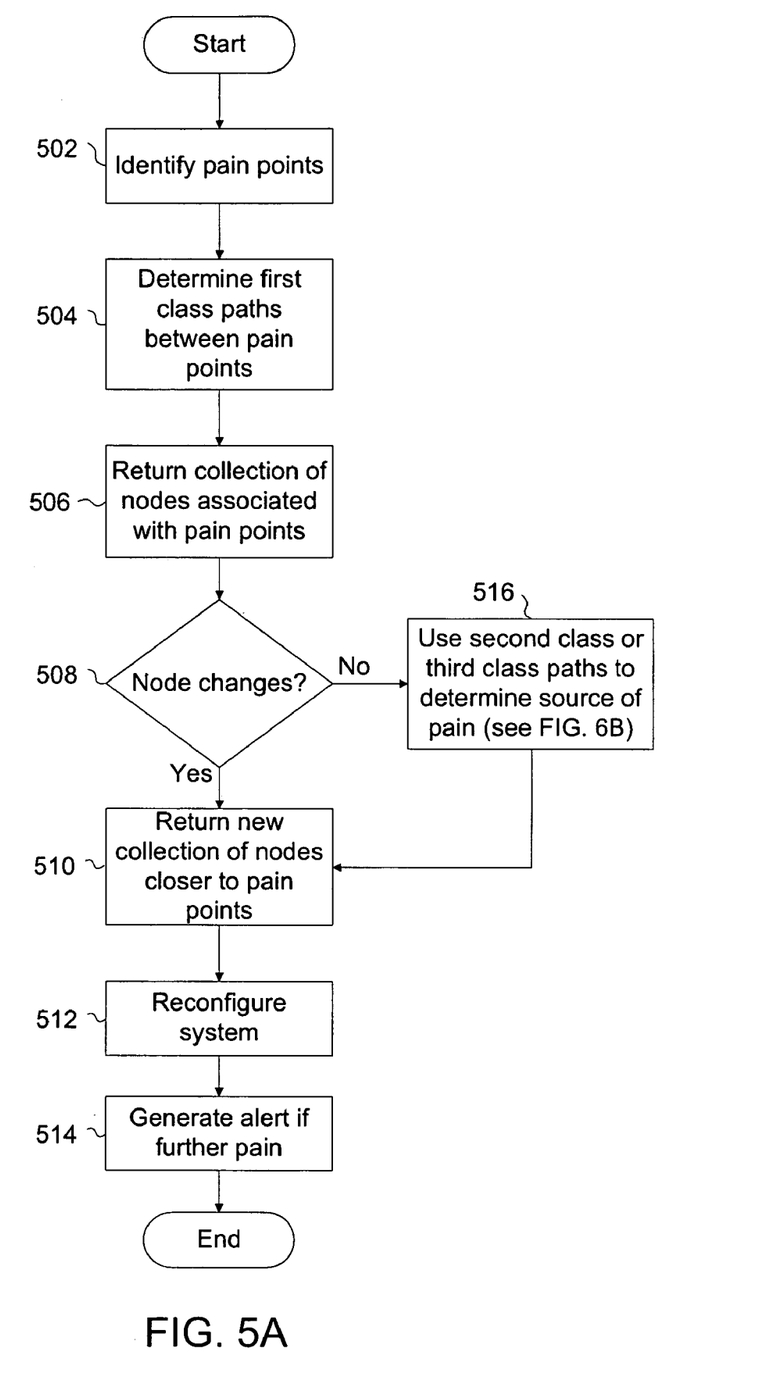
FIG. 5A illustrates an exemplary process for reactively using a trade-off/semantic network.

FIG. 5A illustrates an exemplary process for reactively using a trade-off/semantic network. In this example, a current system configuration may have pain points associated with system elements that are under, over, or non-performing. Here, these pain points are identified (502). As an example, pain points may be described as locations in a TOSN where pain such as that described above exists. Once identified, first-class paths are determined between pain points (504). First-class paths refer to paths in a TOSN that would provide for a direct path between a pain point and one or more elemental attributes that may be responsible for causing the pain. Second-class paths may include paths that These paths take authored information into account such as the direction of the relationship between two elemental attributes and whether the relationship exists under the current configuration (e.g., the strength of the relationship is not zero). By establishing a first class path, seemingly-unrelated pain points may be determined to have a common cause, aiding in corrective action. In some cases, first-class paths may involve more than the affected elemental attribute and a causation elemental attribute. First-class paths may also represent causation links between a performance effect and a system resource, component, or device. Once first-class paths have been determined between pain points, a collection of elemental attributes is returned which identifies pain points and associated first-class paths (506). A determination is made as to whether any of the elemental attributes in the returned collection have changed (508). If change has occurred, then a new collection of elemental attributes is returned, which provide a system configuration that is closer to the pain points (510). In other words, changing elemental attributes may alter a system configuration and first class paths may be modified to represent different causes or effects of pain. After returning a new collection of elemental attributes, a system (e.g., system 112) may be reconfigured according to a TOSN to account for the pain points and new collection of elemental attributes, thus enabling pain to be alleviated or eliminated (512). An alert may be generated after a new configuration is implemented (514). However, if an elemental attribute has not changed, then determination of paths associated with pain points has not been achieved and subsequent classes of paths, such as second class or third class paths, may be used (516). Further description of using second and third-class paths is provided in FIG. 5B.

Figure 5B:
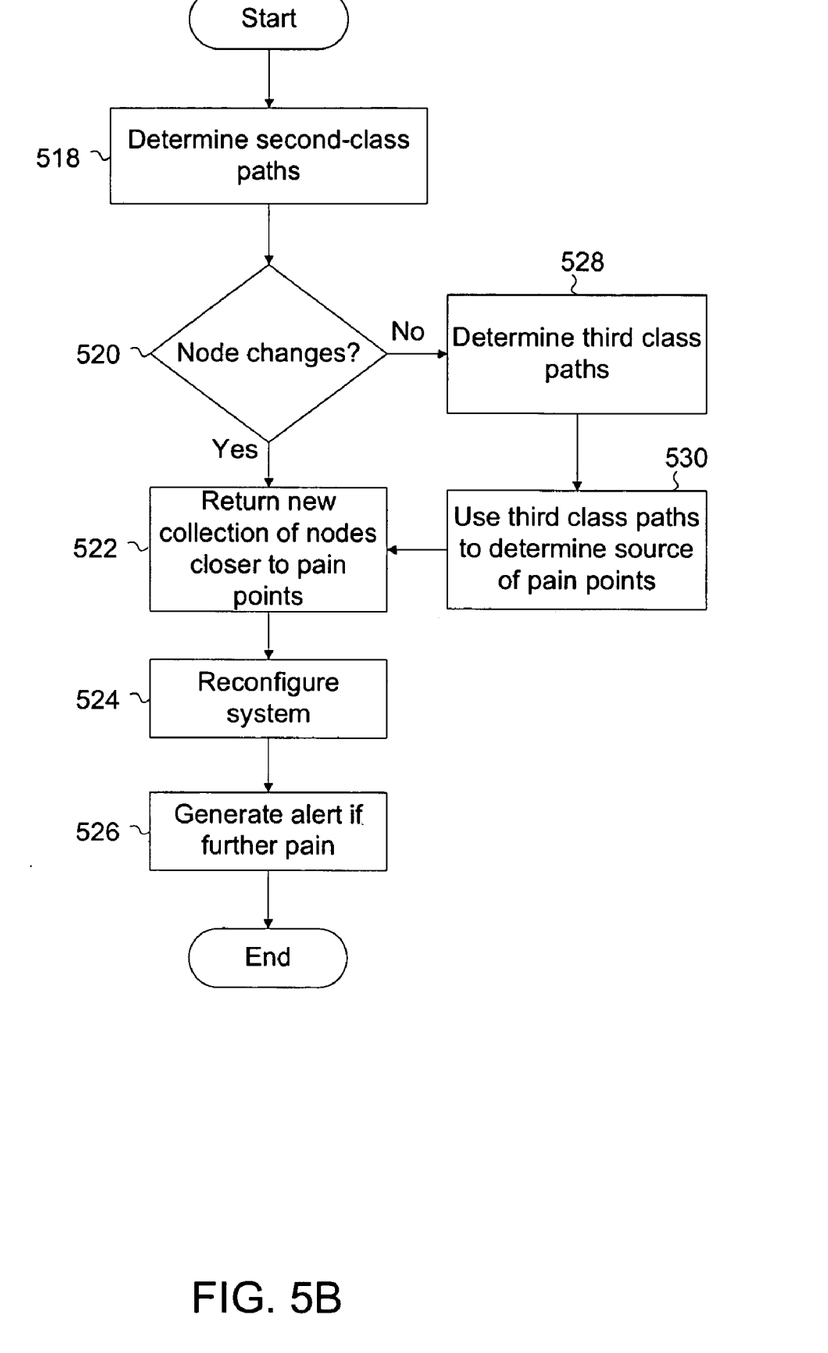
FIG. 5B illustrates an exemplary process for using second and third class paths in a trade-off/semantic network.

FIG. 5B illustrates an exemplary process for using second and third class paths in a trade-off/semantic network. As an example, second and third-class paths may be employed to determine causes of pain in a system. From FIG. 5A, if none of the elemental nodes associated with a first class path have changed, then the process illustrated in FIG. 5B may be performed to determine whether second or third-class paths reveal causes of pain in a TOSN. Here, second class paths are determined (518). As an example, second-class paths are that ignore the direction and strength of trade-off relationships, unlike first-class paths. Also as an example, third-class paths are paths which may include command links or other information that are not used by either first-class or second-class paths. A command link is information other than the strength, direction, or other information used in first and second-class paths. A check is also made as to whether any of the elemental attributes included in the second-class path have changed (520). If changes have occurred, elemental attributes in the second-class path may be causes of pain indicated by TOSN 200 for system 112. If elemental attributes have changed in the second-class paths, then a new collection of elemental attributes may be returned that is closer to the pain points (522). This new collection enables reconfiguration of the system to modify elemental attribute values in order to alleviate or eliminate pain in TOSN 200 (524). Once reconfigured, TOSN 200 may be configured to generate an alert if any further pain occurs (526). However, if none of the elemental attributes in the collection of elemental attributes returned for the second-class path have changed, then third-class paths may be evaluated to determine whether a pain source exists (528). By using third-class paths (e.g., agility extensions), the types of values associated with elemental attributes in these paths may provide indications as to sources of pain being created in a particular configurations (530). Using these indications, reconfiguration or modification of elemental attributes or nodal values may be performed to alleviate or eliminate pain. In some examples, third class paths may include agility extensions, but not describe trade-off relationships, as with first and second-class paths. However, third-class paths provide indications of the existence of a trade-off relationship that exists between elemental attributes and may be used to diagnose an under-performing or non-performing elemental attribute in a TOSN.

Figure 6:
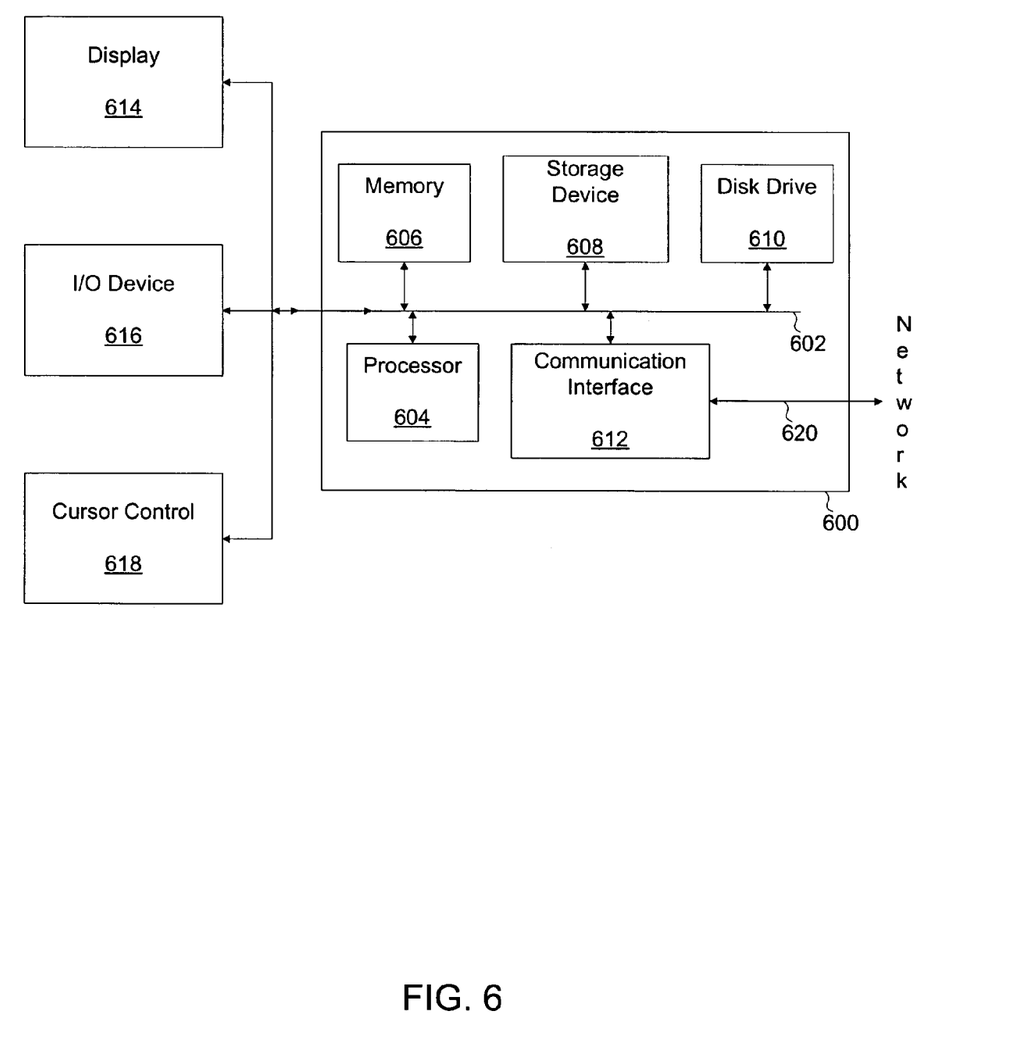
FIG. 6 is a block diagram illustrating an exemplary computer system suitable for implementing a trade-off/semantic network.

FIG. 6 is a block diagram illustrating an exemplary computer system suitable for implementing a trade-off/semantic network. In some examples, computer system 600 may be used to implement the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to one embodiment of the invention, computer system 600 performs specific operations by processor 604 executing one or more sequences of one or more instructions contained in system memory 606. Such instructions may be read into system memory 606 from another computer readable medium, such as static storage device 608 or disk drive 610. In alternative embodiments, hard-wired circuitry may be used in place of or in combination with software instructions to implement the invention.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 600. According to other embodiments of the invention, two or more computer systems 600 coupled by communication link 620 (e.g., LAN, PSTN, or wireless network) may perform the sequence of instructions to practice the invention in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A method implemented at least in part by a computing device for authoring a computer system configuration in a trade-off semantic network, comprising:

receiving an identification of a plurality of elemental attributes;

relating each of the plurality of elemental attributes to each other to configure a trade-off relationship between each of the plurality of elemental attributes; and defining an agility extension configured to modify a value for each of the plurality of elemental attributes, the value affecting the trade-off relationship between each of the plurality of elemental attributes and the trade-off semantic network; and responsive to a user manipulating a value of at least one of the plurality of elemental attributes to cause a change in a system, altering each elemental attribute according to said trade-off relationships, if affected by the tradeoff, to reduce pain in the system configuration.

2. The method recited in claim 1, further comprising communicating data associated with the trade-off relationship from the trade-off semantic network to another trade-off semantic network.

3. The method recited in claim 1, said step of enabling manipulation causes a change in a value of each of the plurality of elemental attributes to cause a change in a system, wherein the system is managed by the trade-off semantic network.

4. The method recited in claim 1, further comprising a taxonomy for reconstituting the plurality of elemental attributes as objects.

5. The method recited in claim 1, further comprising a taxonomy for encapsulating the plurality of elemental attributes.

6. The method recited in claim 1, farther comprising assigning a property to at least one of the plurality of elemental attributes.

7. The method recited in claim 1, further comprising a taxonomy for reconstituting the trade-off relationship into a parent-child relationship.

8. The method recited in claim 1, wherein the trade-off relationship affects at least one elemental attribute in the plurality of elemental attributes.

9. The method recited in claim 1, wherein the trade-off relationship is unidirectional.

10. The method recited in claim 1, wherein the trade-off relationship is bidirectional.

11. The method recited in claim 1, wherein the trade-off relationship characterizes an effect of an elemental attribute on another elemental attribute.

12. The method recited in claim 1, farther comprising implementing the trade-off semantic network to troubleshoot a system.

13. The method recited in claim 1, wherein defining an agility extension further comprises determining the value of an elemental attribute.

14. The method recited in claim 1, wherein defining an agility extension further comprises determining a pain level of an elemental attribute.

15. The method recited in claim 1, wherein defining an agility extension further comprises determining a level of an elemental attribute.

16. The method recited in claim 1, wherein defining an agility extension further comprises determining a strength level of the trade-off relationship.

17. The method recited in claim 1, wherein defining an agility extension further comprises determining the effect of a trade-off relationship on one or more elemental attributes.

18. The method recited in claim 1, wherein defining an agility extension further comprises determining the direction of a trade-off relationship.

19. A method implemented at least in part by a computing device for using a trade-off semantic network to manage one or more computer systems, comprising:
    providing a map of the trade-off semantic network, including a plurality of nodes, each comprising an elemental attribute, and a trade-off relationship between ones of the plurality of nodes, a change in a value of an elemental attribute having an effect on a current configuration due to said trade-off relationship;
    determining if pain exists in the current configuration of said one or more computer systems; and
    altering one or more elemental attribute values of at least two of the plurality of nodes, at least one of the nodes being altered in response the trade-off relationship as a result of altering a first elemental attribute value, to alleviate the pain in said one or more computer systems.

20. The method recited in claim 19, wherein enabling manipulation of a value of each of the elemental attributes is performed until a system requirement is met.

21. A method implemented at least in part by a computing device for using a trade-off semantic network to manage one or more computer systems, comprising:
    identifying a pain point in a system configuration;
    determining a path associated between the pain point and a plurality of elemental attributes, each path defining a trade-off relationship between the attributes;
    returning a plurality of elemental attributes associated with the pain point;
    altering a value of ones of the plurality of elemental attributes, said altered attributes causing a change in others of said elemental attributes connected by said path;
    returning a new plurality of elemental attributes associated with the pain point; and
    altering a value associated with each elemental attribute of the new plurality of elemental attributes to correct the pain point and provide a new computer system configuration.

22. A method as recited in claim 21, wherein the path is a first-class path.

23. A method as recited in claim 21, wherein the path is a second-class path.

24. A method as recited in claim 21, wherein the path is third-class path.

25. A method as recited in claim 21, wherein the path is a command link.

26. A computer program product for configuring a computer system using a trade-off semantic network, the computer program product being embodied in a computer readable medium and comprising computer instructions for:
    receiving an identification of a plurality of elemental attributes;
    relating each of the plurality of elemental attributes to each other to configure a trade-off relationship between each of the plurality of elemental attributes;
    defining an agility extension configured to modify a value for each of the plurality of elemental attributes, the value affecting the trade-off relationship between each of the plurality of elemental attributes;
    responsive to a user manipulating a value of at least one of the plurality of elemental attributes to cause a change in a system, altering each elemental attribute according to said trade-off relationships, if affected by the tradeoff, to reduce pain in the system configuration.

* * * * *